March 10, 1964  M. CORNELL  3,124,270
METERING PUMP CONTROL SYSTEM
Filed March 16, 1961  3 Sheets-Sheet 1
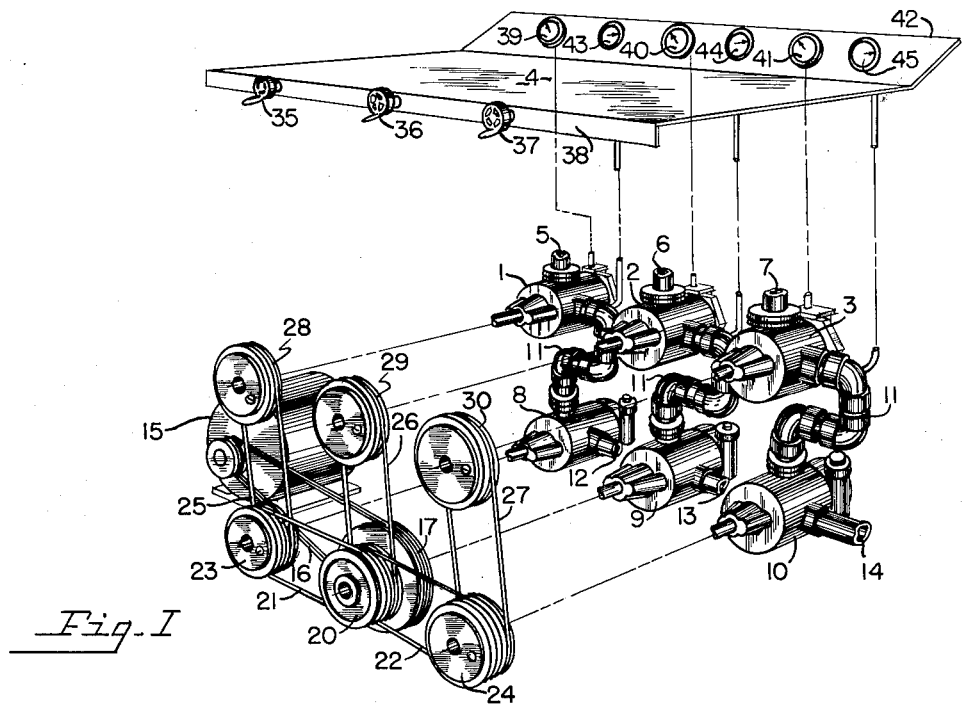
Fig. I
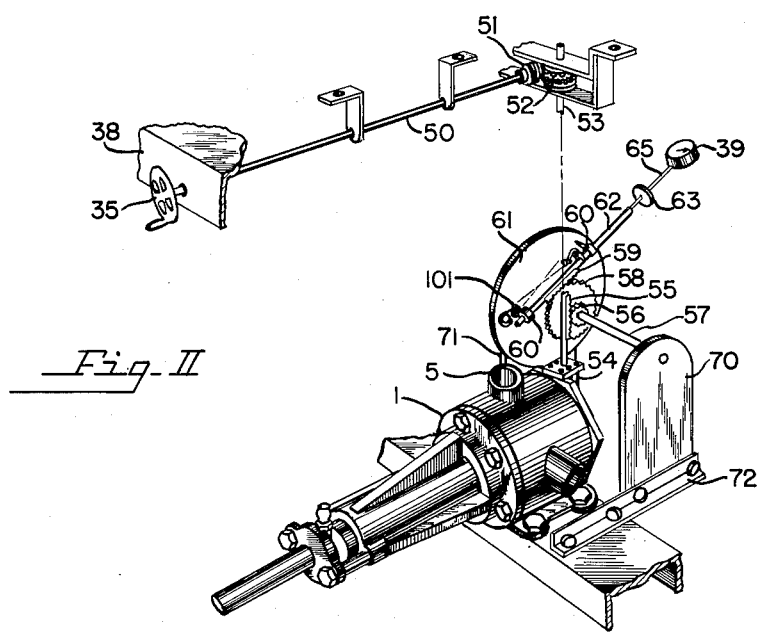
Fig. II
INVENTOR.
MEAD CORNELL
BY
Marshall & Wilson
ATTORNEYS

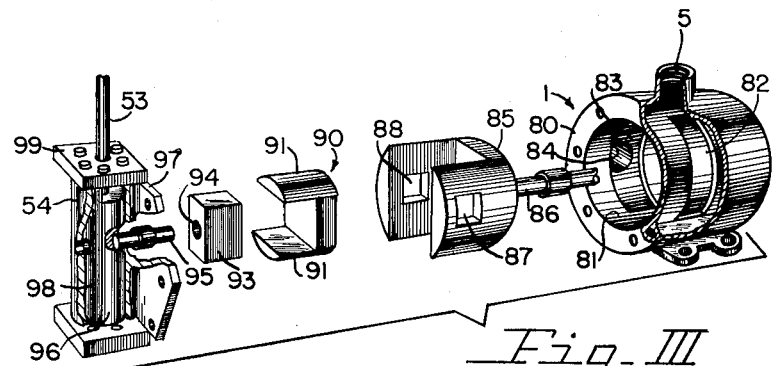
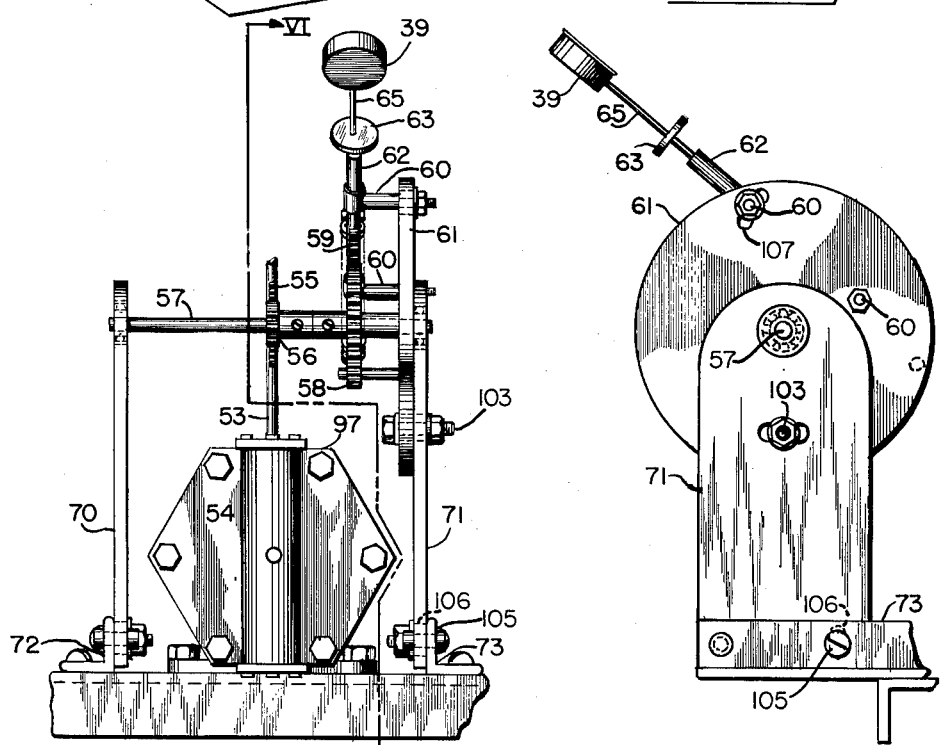
*INVENTOR.*
MEAD CORNELL
BY Marshall + Wilson
ATTORNEYS

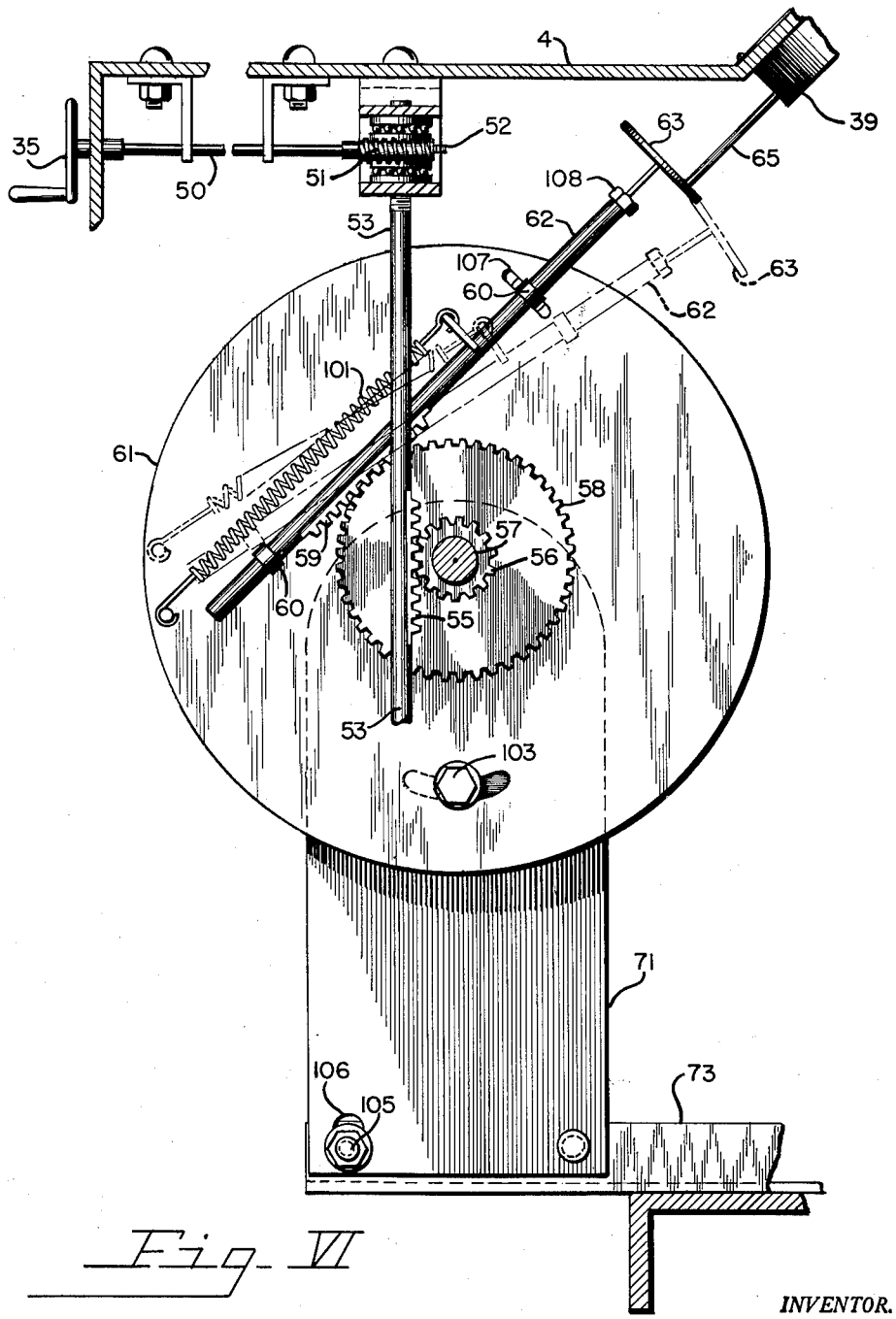

United States Patent Office 3,124,270
Patented Mar. 10, 1964

3,124,270
METERING PUMP CONTROL SYSTEM
Mead Cornell, 149 California St., San Francisco, Calif.
Filed Mar. 16, 1961, Ser. No. 96,249
5 Claims. (Cl. 222—23)

This invention relates to metering pumps and in particular to improvements in the control system for a metering pump that provides for convenience in adjustment and high accuracy in operation.

Metering pumps are often used when several liquid ingredients are to be combined into a blended product and in which each of the ingredients must enter into the product in a precisely determined proportion.

The principal object of this invention is to provide a control and volumetric displacement indicator for a variable positive displacement pump the settings of which control may be positively and accurately reproduced and the indications of which agree to a high degree of precision with the actual volumetric delivery of the pump at the given settings of the control mechanism.

Another object of the invention is to provide a control system for a variable positive displacement pump in which changes in volumetric displacement may be easily made and in which the indicating mechanism may be adjusted to precisely indicate the volumetric displacement at which the control is set and the pump is delivering material.

More specific objects and advantages may be obtained by a control for a variable positive displacement pump constructed according to the invention.

According to the invention a variable positive displacement pump is provided with a direct acting control mechanism in which equal increments of displacement of the control mechanism result in equal increments of volumetric displacement of the pump and in which the increments of movement of an indicating mechanism, for each increment of movement of the control mechanism, may be adjusted to provide an exact direct indication of the volumetric displacement at which the pump is adjusted.

A preferred form of the invention is illustrated in the accompanying drawings.

In the drawings:

FIG. I is a schematic perspective view of a blending or mixing system employing a plurality of metering pumps constructed according to the invention and arranged to cooperate in mixing or blending a product having precisely specified proportions of ingredients.

FIG. II is a perspective diagram showing one of the metering pumps together with the mechanism for controlling and indicating the volumetric displacement of the pump.

FIG. III is a perspective exploded view of the metering pump.

FIG. IV is an end view with parts broken away showing the essential components of the indicator drive mechanism.

FIG. V is a side elevation of a portion of the drive mechanism illustrating one of the adjustments of the system.

FIG. VI is an enlarged vertical section taken substantially along the line VI—VI of FIG. IV to show the details of the indicator drive mechanism.

These specific figures and the accompanying description are intended merely to illustrate the invention and not to impose limitations on its scope.

Referring to FIG. I, a plurality of metering pumps 1, 2 and 3 are shown as being located below a control table or desk top 4. The metering pumps 1, 2 and 3 have discharge lines 5, 6 and 7 respectively that may be connected to a manifold leading to a blended product receiver. The manifold is not shown. To eliminate pressure differences across the metering pumps the metering pumps 1, 2 and 3 are provided with booster pumps such as booster pumps 8, 9 and 10 that have their outlets connected through individual piping 11 to each of the metering pumps. Individual inlet pipes 12, 13 and 14 are provided for the booster pumps, these pipes being connected to the respective liquid supplies of the various components going into the blended product.

The assembly of pumps is driven by an electric motor 15 that is connected through a belt 16 to a drive pulley 17 mounted on the shaft of the booster pump 9. A three-grooved pulley 20, mounted on the shaft of the booster pump 9, is attached to the pulley 17 and is connected through belts 21 and 22 to equal diameter pulleys 23 and 24 mounted on shafts of the booster pumps 8 and 10 to drive these pumps at the same speed as the pump 9.

The pulleys 20, 23 and 24 are also connected through belts 25, 26 and 27 to pulleys 28, 29 and 30 mounted respectively on the shafts of the metering pumps 1, 2 and 3. The pulleys 28, 29 and 30 are of equal diameters and each is slightly larger, in a ratio of about 6:5, than the corresponding pulleys 23, 20 and 24 so that the metering pumps run slightly slower than the corresponding booster pumps. This difference in speed of the drive to the pumps permits the same type of pump to be used as a booster pump and as a metering pump, the booster pumps being arranged to automatically vary their displacement to maintain an output pressure equal to the pressure at the outlets of the metering pumps in their output connections 11 while the metering pumps are arranged for positive control of their volumetric displacement to positively control the amount of liquid pumped per revolution. The difference in speed insures that there will always be a supply of liquid to the metering pumps regardless of the adjustment of the volumetric displacement of the metering pump.

As indicated in FIG. I and as shown in detail in the other figures, control means starting with hand wheels 35, 36 and 37, protruding from an apron 38 of the desk top 4, are arranged through gearing to operate the volumetric displacement controls of the pumps and the positions of such controls are indicated on dial indicators 39, 40 and 41 mounted in a panel 42 at the rear of the desk top 4. Pressure gauges 43, 44 and 45 are also provided, these gauges being connected to the pipe connections 11 between the booster pumps 8, 9 and 10 and the corresponding metering pumps 1, 2 and 3 to indicate the adjustment of the pressure control of the booster pumps in relation to the desired output manifold pressure. Preferably these pressures are adjusted so that there is little or no pressure drop or a very small pressure rise across the metering pumps. This elimination of pressure drop is desirable to prevent leakage of liquid through the clearances of the pump thus causing the actual delivery of the pump to differ from the mechanically controlled volumetric displacement of the pump.

Referring to FIG. II, the volumetric displacement control for the metering pump 1, starting wtih the hand wheel 35, includes the hand wheel 35, a shaft 50 that carries a worm 51 meshing with a worm wheel 52 that is threaded onto an axially movable but non-rotatable control rod 53. The control rod 53 extends into an end housing 54 of the metering pump 1. Thus rotation of the hand wheel 35, by turning the worm wheel 52, elevates or lowers the control rod 53 thus changing the volumetric displacement of the metering pump 1. The amount of movement of the control rod 53 is indicated by a mechanism that includes a rack 55 on the control rod 53 that meshes with a first pinion 56 carried on a shaft 57. A gear wheel 58 also mounted on the shaft 57 and turning the pinion 56 engages a rack 59 that is slidably mounted in guides 60 attached to an adjustable control plate 61. An extension 62 of the rack 59 carries an abutment plate 63 whose flat surface, extending transversely of the length of the extension 62, engages a stem 65 of the dial indicator 39 serving as the volumetric displacement indicator.

The shaft 57 carrying the pinion 56 and the gear wheel 58 is journalled in a front bracket 70 and a rear bracket 71 erected from angle iron supports 72 and 73 mounted on the base for the metering pump 1.

Referring to FIG. III, each of the metering pumps, such as the pumps 1, 2 and 3, comprises a stationary casing 80 having a liner 81 provided with a discharge slot 82 and an inlet slot 83. The inlet to the pump from the booster pump connection 11 may enter through a port 84 in communication with the inlet slot 83 and the discharge is taken through the slot 82 and out through the exhaust or outlet port 5.

A rotor 85 is fitted within the liner 81 of the housing 80 and rotated by a shaft 86. The rotor 85 is generally cylindrical in end view and U-shaped in plan as shown in FIG. III with the arms of the U-shape being pierced by ports 87 and 88. A piston 90 in the form of a U-shaped block is slidable in the space between the arms of the rotor 85. Each of the legs of the U-shaped piston 90 has an outer cylindrical surface 91 that is of the same radius of curvature as the cylindrical rotor 85 so that when the piston is at either end of its stroke its cylindrical periphery matches the periphery of the rotor. The total length of the piston 90 transversely of the shaft is less than the diameter of the cylindrical rotor 85 by an amount equal to the maximum stroke of the piston.

A shuttle 93, which is a rectangular block the long dimension of which fits the slot in the piston 90, is arranged so that it can slide back and forth within such slot through a distance equal to the maximum stroke of the piston in the rotor 85. The shuttle 93 has an axial bore 94 that fits over a shuttle pin 95 which in turn is pressed into a transverse hole in a slide block 96 mounted to slide endwise in a bore in an end plate 97 of the pump 1. The slide block 96 is in the form of a cylinder having a portion sliced axially off one side and a piece 98 similar to the sliced off portion is securely mounted in the bore in the end plate 97 to prevent rotation of the slide block 96. The slide block 96 is connected to the control rod 53 and is positioned lengthwise in the bore by longitudinal motion of the control rod 53. While not shown in the drawings a seal is preferably provided in a top plate 99 closing the end of the bore to seal the joint around the control rod 53. A longitudinal groove is preferably cut in the slide block 96 from end to end to vent the chambers at the ends of the slide block 96 to the pump and to each other to prevent compression of liquid in these chambers which would prevent adjustment of the slide block 96 in its bore.

A pump of this construction, as more fully described in Waite Patent No. 2,018,693, issued October 29, 1935, has zero volumetric displacement when the shuttle pin 95 is axially aligned with the input shaft 86. When the pin is so aligned the piston 90 rotates with the rotor 85 without sliding and the shuttle 93 rotates with the piston 90 without sliding. When the shuttle pin 95 is moved upwardly by movement of the control rod 53 the eccentricity of the pin 95 with respect to the axle causes the shuttle 93 to slide in the piston 90 and causes the piston 90 to slide in the slot in the rotor 95 in time with the rotation of the rotor so that liquid is then pumped from the inlet 84 to the outlet 5 or vice versa depending upon the direction of the rotation. In this arrangement the stroke of the shuttle 93 in the piston 90 and the stroke of the piston 90 in the rotor 85 is exactly twice to the eccentricity of the shuttle pin 95 with respect to the axis of the shaft 86. Thus the volumetric displacement of the metering pump is exactly proportional to the linear displacement of the slide block 96 carrying the shuttle pin 95.

Referring to FIGS. II, IV and VI the movement of the control rod 53, which is directly proportional to the change in volumetric displacement of the pump, by driving through the rack 55, pinion 56, shaft 57, gear wheel 58, and rack 59 drives the rack and its extension 62 through a distance that is exactly proportional to the movement of the control rod 53. A spring 101 connected to the rack member 59 continually urges the rack member in one direction and thus takes up all the back lash in the gearing. As long as the rack extension 62 moves in a direction exactly parallel to the stem 65 of the indicator 39 the movement of the stem 65 is exactly equal to the movement of the rack extension 62 and therefore is directly proportional to the movement of the control rod 53. The equipment is designed so that in this condition the indications of the dial indicator 39 are slightly less than the corresponding volumetric displacements of the metering pump.

The final adjustment to insure exact correspondence between the indications of the dial indicator 39 and the corresponding volumetric displacements of the metering pump is made by rotating the support plate 61 relative to its support 71 so that the line of movement of the rack 59 and its extension 62 is at an angle to the line of motion of the stem 65 of the dial indicator as indicated by the broken lines of FIG. VI. Because of this change in angle and the fact that the surface of the member 63 is normal to the rack extension 62 it follows that the movement of the stem 65 is greater than the movement of the rack extension 62 by a small amount. Actually the movement of the stem 65 is equal to the movement of the rack extension 62 multiplied by the secant of the angle between the rack extension 62 and stem 65. After adjustment the plate 61 is locked in position by tightening a cap screw 103 that extends through a slot in the plate 61 and is threaded into the bracket 71 or is provided with a nut on the back side of the bracket 71.

Other adjustments include rocking the bracket 71 relative to the angle iron support 73 as may be required to adjust the depth of mesh of the pinion 56 with the rack 55. This adjustment is locked by tightening the nut 105 on a bolt which extends through a slot 106 in the lower corner of the bracket 71. Likewise the depth of mesh of the rack 59 with the gear 58 is controlled by adjusting the guide 60 in a slot 107 in the plate 61.

The zero adjustment of the dial indicator 39 is obtained by varying the position of the abutment 63 by threading its stem into the rack extension 62 and locking it in position with the lock nut 108.

In the design of the metering pump control as illustrated in the drawings the ratio of movement of the control rod 53 and the rack extension 62 is adjusted by selecting the proper gear ratios for the pinion 56 and gear 58 so that a one inch travel of the rack extension corresponds to 100% volumetric displacement of the pump. This ratio is made slightly small to allow adjustment for variations in manufacture and the final adjustment is then made by the positioning of the plate 61 to take advantage in the increase in travel of the stem 65 provided when the rack extension 62 is out of parallel with the stem 65. This final adjustment then provides exact correspondence between the percentage of pump displacement and the indicator travel as measured in inches.

Various modifications of the precise structure may be made without departing from the spirit and scope of the invention.

Having described the invention, I claim:

1. In a liquid pumping and metering system, in combination, a metering pump, means for supplying liquid to the pump at a pressure substantially equal to the discharge pressure of the pump, volumetric displacement control means for the pump that varies the pump volumetric displacement in exact proportion to the movement of the control means, a linear displacement indicator, drive means coupled to the control means for driving the linear displacement indicator through equal increments of distance for equal increments of movement of the control means, and means for adjusting said drive means to vary the magnitude of an increment of distance per increment of movement of the control means.

2. In a liquid pumping and metering system, in combination, a metering pump, means for supplying liquid to the pump at a pressure substantially equal to the discharge pressure of the pump, volumetric displacement control means for the pump that varies the displacement in exact proportion to the movement of the control means, a linear displacement indicator having an input member movable along a linear path, and a member that is coupled to said control means and to said indicator input member, said member being movable along a linear path that is angularly adjustable with respect to the path of the indicator input member.

3. In a liquid pumping and metering system, in combination, a metering pump, means supplying liquid to the pump at a pressure substantially equal to the discharge pressure of the pump, volumetric displacement control means for the pump that varies the displacement in exact proportion to the movement of the control means, a pump delivery indicator, and drive means coupling the indicator to the control means, said drive means including a ratio adjustment whereby the magnitude of the increments of indicator movement per increment of control means movement may be adjusted.

4. In a liquid pumping and metering system, in combination, a metering pump, means supplying liquid to the pump at a pressure substantially equal to the discharge pressure of the pump, volumetric displacement control means for the pump that varies the displacement in direct proportion to the movement of the control means, a pump delivery indicator having an input member movable along a linear path, a drive member coupled to the control means and having a transverse surface engaging the indicator input member, and means defining a path of movement of the drive member that is angularly adjustable relative to the linear path of said input member.

5. In a liquid pumping and metering system, in combination, a metering pump, means supplying liquid to the pump at a pressure substantially equal to the discharge pressure of the pump, volumetric displacement control means for the pump that varies the displacement in direct proportion to movement of the control means, a pump delivery indicator having an input member that is movable along a linear path, a drive member coupled to the control means and having a transverse portion engaging said input member, and means for varying the angle between the paths of movement of the drive member and input member to adjust the response of the indicator to movement of the control means.

References Cited in the file of this patent
UNITED STATES PATENTS

| | | |
|---|---|---|
| 1,964,028 | Boynton et al. | June 26, 1934 |
| 2,018,693 | Waite | Oct. 29, 1935 |
| 2,837,239 | Scholin | June 3, 1958 |